United States Patent
Paquin et al.

(10) Patent No.: US 11,363,041 B2
(45) Date of Patent: Jun. 14, 2022

(54) PROTECTING COMPUTER ASSETS FROM MALICIOUS ATTACKS

(71) Applicant: International Business Machines Corporation, Armonk, NY (US)

(72) Inventors: Adam Paquin, Suwanee, GA (US); Peyton Duncan, Orlando, FL (US); Kevin Shen, Boyds, MD (US); Johathan Bees, Pittsburgh, PA (US); Srinivas Babu Tummalapenta, Broomfield, CO (US)

(73) Assignee: International Business Machines Corporation, Armonk, NY (US)

(*) Notice: Subject to any disclaimer, the term of this patent is extended or adjusted under 35 U.S.C. 154(b) by 252 days.

(21) Appl. No.: 16/875,340

(22) Filed: May 15, 2020

(65) Prior Publication Data

US 2021/0360007 A1 Nov. 18, 2021

(51) Int. Cl.
*H04L 9/40* (2022.01)
*G06N 3/04* (2006.01)
*G06F 40/35* (2020.01)

(52) U.S. Cl.
CPC .......... *H04L 63/1416* (2013.01); *G06F 40/35* (2020.01); *G06N 3/04* (2013.01); *H04L 63/0218* (2013.01); *H04L 63/1433* (2013.01)

(58) Field of Classification Search
CPC ............. H04L 63/1416; H04L 63/0218; H04L 63/1433; H04L 63/1408; H04L 63/1425; H04L 63/1441; H04L 63/145; H04L 63/1458; H04L 63/1466; H04L 63/1475; H04L 63/1483; H04L 63/1491; G06F 40/35; G06F 21/577; G06F 21/552; G06F 21/55; G06F 21/554; G06F 21/556;
(Continued)

(56) References Cited

U.S. PATENT DOCUMENTS 6,829,604 B1 12/2004 Tifft
7,035,849 B2 4/2006 Tifft
(Continued)

FOREIGN PATENT DOCUMENTS

KR 100639997 B1 6/2006
KR 100639997 B1 11/2006

OTHER PUBLICATIONS

Anonymous, "TippingPoint® Security Management System" (Title) Trend Micro, 2019.
(Continued)

*Primary Examiner* — Techane Gergiso
(74) *Attorney, Agent, or Firm* — Law Office of Jim Boice

(57) ABSTRACT

A method selectively installs a particular signature on a particular gateway based on the type of signature and the type of computer asset that is protected by that particular gateway. A system and/or analyst receives multiple signatures, where different signatures from the multiple signatures are specific for different types of computer assets. The system and/or analyst identifies and extracts a particular signature, from the multiple signatures, that will protect, if implemented on the appropriate gateway, a particular computer asset. The system and/or analyst identifies the appropriate gateway that protects the particular computer asset, and installs only the extracted particular signature from the multiple signatures on that appropriate gateway.

20 Claims, 9 Drawing Sheets

(58) Field of Classification Search
CPC ...... G06F 21/56; G06F 21/561; G06F 21/563; G06F 21/565; G06F 21/564; G06F 21/566; G06F 21/567; G06F 21/568; G06F 21/562; G06N 3/04; G06N 20/00; G06N 3/02

See application file for complete search history.

(56) References Cited

U.S. PATENT DOCUMENTS

| | | | |
|---|---|---|---|
| 8,813,228 B2 | 8/2014 | Magee | |
| 9,117,069 B2 * | 8/2015 | Oliphant | H04L 63/1433 |
| 9,807,109 B2 | 10/2017 | Laidlaw | |
| 9,843,596 B1 * | 12/2017 | Averbuch | G06F 21/554 |
| 11,271,907 B2 * | 3/2022 | Xiao | H04L 63/0281 |
| 2003/0110393 A1 | 6/2003 | Brock | |
| 2003/0154399 A1 * | 8/2003 | Zuk | H04L 63/1416 726/11 |
| 2004/0250124 A1 | 12/2004 | Chesla | |
| 2006/0053491 A1 * | 3/2006 | Khuti | H04L 63/20 709/224 |
| 2006/0294579 A1 | 12/2006 | Khuti | |
| 2007/0177615 A1 * | 8/2007 | Miliefsky | H04L 29/06027 370/401 |
| 2007/0209074 A1 | 9/2007 | Coffman | |
| 2008/0052774 A1 | 2/2008 | Chesla | |
| 2008/0092237 A1 | 4/2008 | Yoon | |
| 2008/0262991 A1 * | 10/2008 | Kapoor | H04L 63/1441 706/20 |
| 2008/0282313 A1 | 11/2008 | Diaz-Cuellar | |
| 2010/0287608 A1 | 11/2010 | Khuti | |
| 2011/0030057 A1 * | 2/2011 | Chen | H04L 63/1416 726/25 |
| 2013/0298244 A1 * | 11/2013 | Kumar | G06F 21/51 726/25 |
| 2014/0007238 A1 | 1/2014 | Magee | |
| 2015/0033340 A1 * | 1/2015 | Giokas | H04L 63/1433 726/23 |
| 2015/0100345 A1 | 4/2015 | Holmes | |
| 2015/0163242 A1 | 6/2015 | Laidlaw | |
| 2015/0213272 A1 | 7/2015 | Shezaf | |
| 2016/0173529 A1 | 6/2016 | Baig | |
| 2017/0111391 A1 * | 4/2017 | Chao | H04L 63/1416 |
| 2017/0289180 A1 | 10/2017 | Zheng | |
| 2017/0331841 A1 * | 11/2017 | Hu | G06F 16/285 |
| 2017/0339172 A1 * | 11/2017 | Mahadevia | H04L 63/1416 |
| 2018/0034840 A1 | 2/2018 | Marquardt | |
| 2018/0069865 A1 * | 3/2018 | Rieke | H04L 41/5058 |
| 2020/0137103 A1 | 4/2020 | Ngo | |
| 2020/0153850 A1 * | 5/2020 | Krishnan | H04L 63/205 |
| 2020/0259792 A1 * | 8/2020 | Devarajan | H04L 63/0254 |
| 2021/0084058 A1 * | 3/2021 | Soliman | G06N 3/08 |

OTHER PUBLICATIONS

Written Opinion of the International Searching Authority, PCT/IB2021/063997, dated Jul. 27, 2021.

Keramati et al., "Novel security metrics for ranking vulnerabilities in computer networks." 7'th International Symposium on Telecommunications (IST'2014). IEEE, 2014.

Lippmann et al., "The effect of identifying vulnerabilities and patching software on the utility of network intrusion detection." International Workshop on Recent Advances in Intrusion Detection. Springer, Berlin, Heidelberg, 2002.

Liu et al. "Improving VRSS-based vulnerability prioritization using analytic hierarchy process." Journal of Systems and Software 85.8 (2012): 1699-1708.

Singh et al., "Quantifying security risk by critical network vulnerabilities assessment." International Journal of Computer Applications 156.13 (2016): 26-33.

Pagett et al., . "Improving residual risk management through the use of security metrics." Royal Holloway Series (2010).

Mell et al.,"The NIST Definition of Cloud Computing", NIST, Sep. 2011.

* cited by examiner

PROTECTING COMPUTER ASSETS FROM MALICIOUS ATTACKS

BACKGROUND

The present invention relates to the field of protecting computer assets from malicious electronic attacks. Still, more particularly, the present invention relates to the field of upgrading a gateway that protects computer assets from malicious electronic attacks.

Computer assets, such as databases, servers, programs, data, etc., are often protected by a gateway (e.g., a firewall), which prevents a malicious attack (i.e., an intrusion) from attacking these computer assets. Behind such a gateway are numerous computer assets having different features.

In order to protect the computer assets, the gateway can be updated with solutions to the latest known intrusions by a security vendor. Such solutions are often called "signatures" since they are solutions that are specific to a particular intrusion that has certain code (i.e., binaries). Thus, the term "signature" is used and defined herein as a solution/update/upgrade for a gateway, where the signature addresses an intrusion/threat to a computer asset that is protected by the gateway.

When end users (e.g., analysts and/or automated systems) receive an updated signature, they often are unaware of what particular computer assets are behind different gateways. As such, the updated signatures are often loaded onto all of the gateways used by an enterprise. This leads to decreased performance in the gateways since they become bogged down with irrelevant and unnecessary signatures.

Currently, there is not an effective process for correlating known vulnerabilities to certain computer assets with published vendor signatures. That is, vendors have their own proprietary method to manage protection policies and signatures. As a result, it is currently necessary to either enable signatures in bulk (i.e., install new/updated signatures on all gateways) without specific oversight, and/or to spend a significant amount of time and effort manually reviewing and applying each necessary protection/signature to specific gateways.

SUMMARY

In one or more embodiments of the present invention, a method selectively installs a particular signature on a particular gateway based on the type of computer asset that is protected by that particular gateway. A system and/or analyst receives multiple signatures (e.g., Intrusion Prevention System—IPS signatures) from a signature vendor. Different signatures from the multiple signatures are specific for different types of computer assets. The system and/or analyst identifies a particular signature, from the multiple signatures, which is specific for a particular type of computer asset. This particular signature is code that causes a gateway to block an intrusion from reaching a particular computer asset that is of the particular type of computer asset, as described in its particular asset context. The system and/or analyst extracts the particular signature from the multiple signatures based on the particular asset context, and identifies a particular gateway that protects that particular computer asset. The system and/or analyst then installs the extracted particular signature from the multiple signatures only on that particular gateway.

In one or more embodiments of the present invention, the system and/or analyst affirmatively blocks any other signatures from the multiple signatures, other than the extracted particular signature, from being installed on that particular gateway.

In one or more embodiments of the present invention, the particular computer asset is a database system, and the particular asset context describes a level of vulnerability of the database system, an identification of the database system, a hostname of a host computer on which the database system is running, and an operating system used by the database system.

In one or more embodiments of the present invention, the particular computer asset is a database program, and the particular asset context describes a level of vulnerability of the database program, an identification of the database program, a hostname of a host computer on which the database program is running, a database system used by the database program, and an operating system used by the database system.

In one or more embodiments of the present invention, the method further includes performing a Natural Language Processing (NLP) analysis on a set of vulnerabilities to extract risk related information, where the set of vulnerabilities describes vulnerabilities that apply to the particular gateway, and where the risk related information includes a list of vulnerable network resources that are protected by the particular gateway and that are vulnerable to the intrusion.

In one or more embodiments of the present invention, a vulnerability of the particular computer asset to the intrusion is from a set of identified vulnerabilities, such that the set of identified vulnerabilities are identified in a Common Vulnerability Exposure (CVE) listing that is generated by a third party that monitors vulnerabilities for multiple computer systems.

In one or more embodiments of the present invention, a Deep Neural Network (DNN) is trained to identify which gateway is to receive the new signature based on a particular signature and the particular asset context referenced in that particular signature.

In one or more embodiments of the present invention, a computer program product includes a computer readable storage medium having program code embodied therewith, where the computer readable storage medium is not a transitory signal per se. The program code is readable and executable by a processor to perform a method that includes, but is not limited to: receiving multiple Intrusion Prevention System (IPS) signatures, where different IPS signatures from the multiple IPS signatures are specific for different types of IPS gateways that protect different types of computer assets; identifying a particular IPS signature from the multiple IPS signatures, where the particular IPS signature is specific for a particular type of computer asset, where the particular IPS signature is code that causes a particular IPS gateway to block an intrusion from reaching a particular computer asset that is of the particular type of computer asset, and where the particular computer asset has a particular asset context that is specific for the particular computer asset; extracting the particular IPS signature from the multiple IPS signatures based on the particular asset context; identifying a particular IPS gateway that protects the particular computer asset; and installing only the extracted particular IPS signature from the multiple IPS signatures on the particular IPS gateway.

In one or more embodiments of the present invention, a computer system includes one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method that includes, but is not limited to: receiving multiple Intrusion Prevention System (IPS) signatures, where different IPS signatures from the multiple IPS signatures are specific for different types of IPS gateways that protect different types of computer assets; identifying a particular IPS signature from the multiple IPS signatures, where the particular IPS signature is specific for a particular type of computer asset, where the particular IPS signature is code that causes a particular IPS gateway to block an intrusion from reaching a particular computer asset that is of the particular type of computer asset, and where the particular computer asset has a particular asset context that is specific for the particular computer asset; extracting the particular IPS signature from the multiple IPS signatures based on the particular asset context; identifying a particular IPS gateway that protects the particular computer asset; and installing only the extracted particular IPS signature from the multiple IPS signatures on the particular IPS gateway.

DETAILED DESCRIPTION

Figure 1:
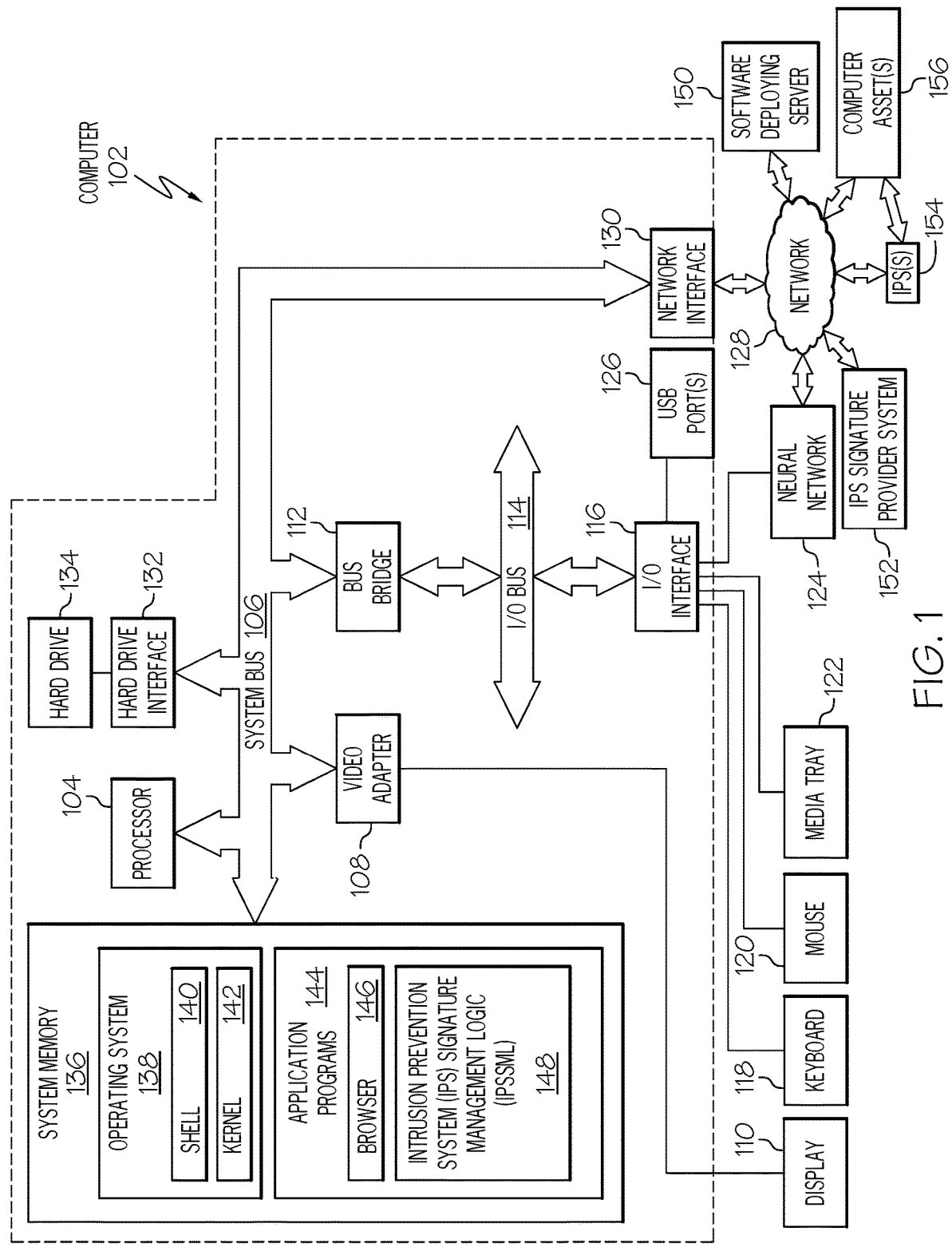
FIG. 1 depicts an exemplary system and network in which the present invention is implemented in one or more embodiments of the present invention.

As described herein and in one or more embodiments, the present invention utilizes a recommendation engine that gathers Common Vulnerability Exposure (CVE) information and other types of vulnerability information and scan data. From this information/data, the present invention evaluates a CVE base score (e.g., how serious the intrusion/attack is, based on how important the resource being attacked is, the impact on the entire system, etc.), an attack vector (e.g., a pathway through which the intrusion is designed to take), an impact score (based on the impact that the intrusion would have on a particular set of computer assets), an exploit score (e.g., a level of which the intrusion can exploit/extract computer assets such as data, programs, etc.), a signature accuracy (e.g., how accurately the signature recognizes the intrusion that it was designed to counter), a signature implementation impact (e.g., the amount of time and resource usage required to install and implement the signature), and a vendor recommendation (e.g., which gateway is recommended by the signature vendor/supplier to install the new signature).

In one or more embodiments of the present invention, the system uses this data to filter only on network exploits, such as which computer assets would be affected by the intrusion. The system recommendations for which gateway is to have the signature installed thereon is based on a weighted metric that is compared against a matrix of responses from the system.

In one or more embodiments of the present invention, a recommendation is provided to the user/system/analyst, which can choose to block or not block the installation of the signature on the protection devices (e.g., the gateways, firewalls, etc.).

In one or more embodiments of the present invention, an implementation engine compiles the correct syntax to enable the signature on the protection device as well as any other related and necessary mechanisms.

In one or more embodiments of the present invention, inventory scan data (amongst others) that describes which computer assets are used/managed/owned by a particular customer is incorporated into the recommendation to filter out non-relevant threats. That is, if a signature vendor sends a customer a new signature that protects a certain type of computer asset, but the customer's inventory scan data reveals that this type of computer asset is not used by that customer, then the customer does not install the new signature on any of its gateways.

No existing tooling found in the prior art uses a combination of vulnerability data, live device configuration and scan data in a manner to cause a system and/or analyst to automatically assess and implement protection across multiple different vendor platforms in a single request. One or more embodiments of the present invention, however, provide these features.

As such, one or more embodiments of the present invention gather vendor unique vulnerability definitions and key them with CVE unique fields in a common vulnerability database.

Using assessment techniques that are Security Operation Center (SOC) based, one or more embodiments of the present invention programmatically recommend protection techniques in real time.

Thus, and as described herein, one or more embodiments of the present invention simplify the process of protecting against known vulnerabilities by automating prevention policy modification at scale and across a multitude of vendors. One or more embodiments of the present invention take a given vulnerability identifier or vulnerability keyword, correlate it with protection rules from multiple vendors, and then query a customer's devices to determine whether they are currently protected. Based on data from vulnerability information repositories such as severity, access vector, and system impact, one or more embodiments of the present invention determine which risks should be prioritized.

In addition, one or more embodiments of the present invention gather information from scan data (i.e., data that is obtained by scanning computer assets in order to identify their existence and their features/context) in order to determine which systems are vulnerable and applies appropriate recommended protections. One or more embodiments of the present invention then automatically apply a fix (signature) on the customer's gateway device, such as updating the gateway device's signatures from the vendor and/or enabling signatures in the relevant profile.

In one or more embodiments of the present invention, vendors' Intrusion Prevention System (IPS) rule databases are aggregated so that CVEs are associated with each vendor's internal identifier (ID) for the associated rule. Each set of CVE and vendor IDs is stored alongside metadata such as description, severity, device impact, and the updated version in which each vendor introduced the rule protecting against it. In one or more embodiments of the present invention, the data used to populate this store of the aggregated database is sourced from each vendor's physical devices and/or using the vendor's online Application Program Interface (API). The data is stored centrally, so only one database needs to be created for all users of the software, reducing the amount of time needed to update records. As such, in one or more embodiments of the present invention, records are only updated when each vendor pushes a change to its IPS ruleset.

After collecting the central database of threat protection rules, one or more embodiments of the present invention allows users to query this central database by CVE or keyword. Based on the vendor the customer uses, the rule ID for the proper vendor is then returned. Correlating this rule ID with data stored in online CVE repositories, one or more embodiments of the present invention assess the potential risk level of the vulnerability and how important it would be to block an exploit of the vulnerability at the network level. In one or more embodiments of the present invention, this process uses factors such as access vectors (e.g., it will disregard attacks that require physical access rather than using remote access) and affected applications/operating systems (e.g., it will not prioritize a first type of operating system's vulnerability on a firewall/gateway that protects a second type of operating system machines). After compiling this information, one or more embodiments of the invention makes a decision on the optimal IPS policy for the rule (block, log, allow, etc.), as well as provides a context for the priority level and time-sensitivity of the matter. If the system/user/analyst accepts the suggested configuration, one or more embodiments of the invention will proceed to automatically install the new policy (i.e., signature) or modify the existing policy/signature. Furthermore, one or more embodiments of the invention also check the version of the IPS database installed, and prompt the user/system/analyst to install the latest one, should an update exist.

As used in the present patent application, a "weakness" to a computer asset is defined as a feature in the computer asset that makes it vulnerable to malicious actions. For example, a new code version may not generally protect a particular port in a network router, thus making this particular port "weak." As such, a Common Weakness Enumeration (CWE) is a standard used to describe such identified/discovered weaknesses.

As used in the present patent application, a "vulnerability" is defined as a specific vulnerability of a computer asset caused by the weakness. For example, if a new code version does not protect a particular port in a network router, then that particular port is vulnerable to malicious attacks, thus making that particular port expressly open to attacks ("vulnerable"). As such, a Common Vulnerability Exposure (CVE) is a standard used to describe such specifically identified/discovered vulnerabilities.

As such, a "weakness" describes a general level of vulnerability to malicious attacks, while a "vulnerability" describes exposure to a specific type of malicious attack.

As used in the present patent application, the term "intrusion" is defined as a malicious attack on a computer asset. Examples of intrusions include, but are not limited to, malware such as viruses, unauthorized keystroke recorders, unauthorized data extraction programs, etc.

As used in the present patent application, the term "Intrusion Prevention System", or IPS, is defined as a system, such as a firewall or a gateway, to protects an intrusion from reaching a protected computer asset. Such firewalls/gateways are implemented in hardware, software, and/or a combination of hardware and software.

As used in the present patent application, the term "signature" is defined as a protective code that, when installed on an IPS, prevents an intrusion from reaching a protected computer asset.

With reference now to the figures, and in particular, to FIG. 1, there is depicted a block diagram of an exemplary system and network that can be utilized by and/or in the implementation of one or more embodiments of the present invention. Note that some or all of the exemplary architecture, including both depicted hardware and software, shown for and within computer 102 can be utilized by neural network 124 and/or software deploying server 150 and/or Intrusion Prevention System (IPS) signature provider system 152, IPS(s) 154, and/or computer asset(s) 156.

Exemplary computer 102 includes a processor 104 that is coupled to a system bus 106. Processor 104 can utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which can include storage devices such as CD-ROM drives, multi-media interfaces, etc.), a neural network 124, and external USB port(s) 126. While the format of the ports connected to I/O interface 116 can be any known to those skilled in the art of computer architecture, in one embodiment, some or all of these ports are universal serial bus (USB) ports.

As depicted, computer 102 is able to communicate with the neural network 124 and/or the software deploying server 150 and/or the IPS signature provider system 152 and/or the IPS(s) 154 and/or the computer asset(s) 156 using a network interface 130 to a network 128. Network interface 130 is a hardware network interface, such as a network interface card (NIC), etc. Network 128 can be an external network such as the Internet or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is a volatile memory in computer 102. This volatile memory includes additional levels of memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process, and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include an Intrusion Prevention System (IPS) Signature Management Logic (IPSSML) 148. IPSSML 148 includes code for implementing the processes described below, including those described in FIGS. 2-7. In one embodiment, computer 102 is able to download IPSSML 148 from software deploying server 150, including in an on-demand basis, wherein the code in IPSSML 148 is not downloaded until needed for execution. Note further that, in one embodiment of the present invention, software deploying server 150 performs all of the functions associated with the present invention (including execution of IPSSML 148), thus freeing computer 102 from having to use its own internal computing resources to execute IPSSML 148.

Also connected to (or alternatively, as part of) computer 102 is the neural network 124. In one or more embodiments of the present invention, neural network 124 is a deep neural network (see FIG. 6), a convolutional neural network, or another type of heuristic artificial intelligence.

Figure 2:
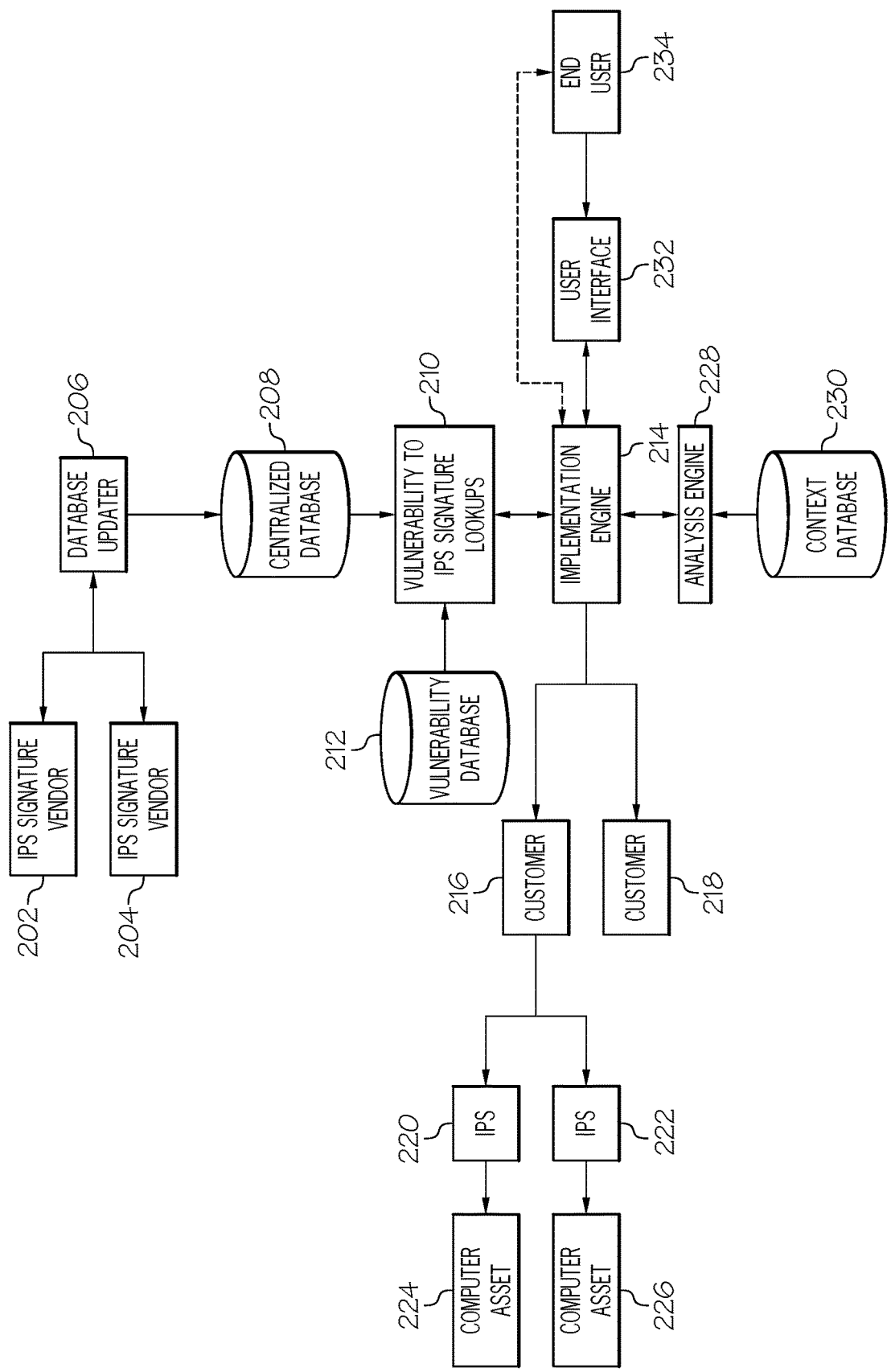
FIG. 2 illustrates a high-level overview of components of one or more embodiments of the present invention.

Also connected to (or alternatively, as part of) computer 102 is an IPS signature provider system 152, which is a system used by a vendor of IPS signatures (e.g., IPS signature vendor 202 and/or IPS signature vendor 204 shown in FIG. 2). As defined herein, a "signature" is matched to a specific intrusion binary, such that the "signature" is defined as code that prevents an intrusion binary from reaching a computer asset (e.g., computer asset 224 and/or computer asset 226 shown in FIG. 2) that is protected by an IPS gateway, such as IPS 220 and/o IPS 222 shown in FIG. 2.

As such, IPS(s) 154 shown in FIG. 1 are analogous to exemplary IPS 220 and/or IPS 222 shown in FIG. 2, and computer asset(s) 156 are analogous to exemplary computer asset 224 and/or computer asset 226 shown in FIG. 2.

Note that the hardware elements depicted in computer 102 are not intended to be exhaustive, but rather are representative to highlight essential components required by the present invention. For instance, computer 102 can include alternate memory storage devices such as magnetic cassettes, digital versatile disks (DVDs), Bernoulli cartridges, and the like. These and other variations are intended to be within the spirit and scope of the present invention.

With reference now to FIG. 2, a high-level overview of components of one or more embodiments of the present invention is illustrated.

In describing FIG. 2, the terms Intrusion Prevention System (IPS), gateway, firewall, and IPS gateway are used interchangeably to describe exemplary IPS 220 and IPS 222.

As shown in FIG. 2, one or more signature vendors (e.g., IPS signature vendor 202 and/or IPS signature vendor 204) provide signatures for the use of one or more customers (e.g., customer 216 and/or customer 218) via an implementation engine 214.

The signature vendors (e.g., IPS signature vendor 202 and/or IPS signature vendor 204) send new/updated signatures (i.e., code that, when implemented in a firewall/gateway such as IPS 220 and/or IPS 222, provides protection from newly identified intrusions) to a database updater 206.

Database updater 206 chronologically executes the new signatures by querying data sources for signature-specific metadata and then inserts extracted metadata into a centralized database 208. That is, the signatures from the signature vendors (e.g., IPS signature vendor 202 and/or IPS signature vendor 204) include metadata about such signatures. This metadata is then used to correlate a vulnerability (e.g., a Common Vulnerability Exposure—CVE) with a particular gateway (e.g., IPS 220) through the use of vulnerabilities found in vulnerability database 212, which are applied to the vulnerability to IPS signature lookups 210.

Vulnerability to IPS signature lookups 210 is a lookup system that matches metadata for a particular IPS signature to a particular vulnerability. That is, given a particular CVE identifier for a particular computer asset, the vulnerability to IPS signature lookups 210 matches that particular CVE identifier to known vendor IPS signatures and information for such known IPS signatures. One or more of these known vendor IPS signatures and their attendant information are sent to an implementation engine 214, in order to send the appropriate signature to the appropriate gateway (e.g., IPS 220 and/or IPS 222).

However, assume for purposes of illustration that IPS 220 is able to load signatures from either IPS signature vendor 202 or IPS signature vendor 204 and that IPS 222 is able to load signatures from either IPS signature vendor 202 or IPS signature vendor 204, even though computer asset 224 and computer asset 226 are different types of computer assets (e.g., run on different types of hosts, different types of operating systems, use different types of databases, etc.).

For example, assume that computer asset 224 is a program that uses database structure A, which runs on a first type of OS. Furthermore, assume that computer asset 226 is a program that uses database structure B, which runs on a second type of OS. Assume further that a new signature is specific for assets that only run on the first type of OS. However, the end user 234 often will not know any details about the computer asset 224 or the computer asset 226. As such, without the present invention, the end user 234 will direct the implementation engine 214, via a user interface 232, to install the new signature received from the IPS signature vendor 202 on both the IPS 220 and the IPS 222, even though it is not useful to IPS 222 (which has been assigned to protect only computer assets 226 that run on the second type of OS.) This over-installation causes unnecessary signatures to be installed on the IPSes, thus degrading their performance.

One or more embodiments of the present invention solve this problem by the use of a context database 230 and an analysis engine 228.

Context database 230 includes information that describes specific computer assets (e.g., computer asset 224). For example, and in one or more embodiments of the present invention, assume that the context entry for computer asset 224 in the context database 230 provides information about the infrastructure of the computer asset 224. If the computer asset 224 is a file, then the infrastructure includes other files that make up a file cluster with the computer asset 224, what application is being used with that file, what operating system is used with that application, what host system holds that file and/or application, etc.

In one or more embodiments of the present invention, if the end user 234 (e.g., a computer system such as computer 102 shown in FIG. 1 and/or an analyst using the user interface 232) determines that a particular computer system does not have all of these features (e.g., is a particular type file, and/or uses a type of particular application, and/or runs one a particular operating system, etc.), then no execution/implementation of the new signature is taken. That is, if the new signature is only for computer assets that run on the first type of OS, but the enterprise only runs applications on the second type of OS, then there is no need to install that new signature on any IPS gateway used by that enterprise. As such, the implementation of that new signature is blocked from being sent to any IPS gateway used by that enterprise.

However, if that enterprise contains a computer asset (e.g., computer asset 224) for which the new signature is designed to protect when installed on its gateway (e.g., IPS 220), then the end user 234 installs that new signature on IPS 220 but not IPS 222 (assuming that there are no assets in computer asset 226 that are protected by the new signature if installed on IPS 222).

In one or more embodiments of the present invention, the decision as to whether or not to implement a particular signature is based on multiple factors (beyond what type of OS is being run by an asset, as described in the example above), as evaluated by an analysis engine 228, using information from the context database 230.

That is, in one or more embodiments of the present invention, the analysis engine 228 uses a CVE scoring (i.e., a score on how vulnerable a particular asset, such as computer asset 224, is to attack); the attack vector (i.e., through which channel/port/etc. the intrusion is designed to use when attacking the particular asset); a history of when, where, and how often the intrusion has struck other computer assets; and/or a record of how effective the signature supplied by the signature vendor has been in thwarting past attacks on other computer assets to decide whether or not to install the newly-received signature and/or on which IPS to install the newly-received signature.

In one or more embodiments of the present invention, scan data (e.g., information that describes computer assets and/or how the intrusion has impacted other systems and their components in the past) is also used for impact validation as to how dangerous the intrusion is to a present computer asset. This information is used in one or more embodiments of the present invention by the implementation engine 214 when deciding if and/or on which IPS to install the newly-received signature.

In one or more embodiments of the present invention, the analysis engine 228 also uses IPS context, for a particular IPS gateway such as computer asset 224, from the context database 230 that includes information about the IPS 220 such that a policy can be implemented. That is, in one or more embodiments of the present invention, the analysis engine 228 not only considers the context of the computer asset (e.g., computer asset 224) but also considers the context of the protective gateway (e.g., IPS 220). As such, the analysis engine 228 uses an IPS CVE scoring (i.e., a score on how vulnerable a particular IDS gateway, such as IPS 220, is to attack); an IPS attack vector (i.e., through which channel/port/etc. the intrusion is designed to use when attacking the particular IPS gateway); a history of when, where, and how often the intrusion has struck other computer IPS gateways; and/or a record of how effective the signature supplied by the signature vendor has been in thwarting past attacks on other computer assets by other IPS gateways when deciding if and/or on which IPS to install the newly-received signature.

Thus, in one or more embodiments of the present invention, FIG. 2 depicts how a particular IPS signature is selectively implemented on a particular IPS based on what type of computer asset is protected by that particular IPS signature, the asset context of that computer asset, and/or the IPS context of that particular IPS.

Figure 3:
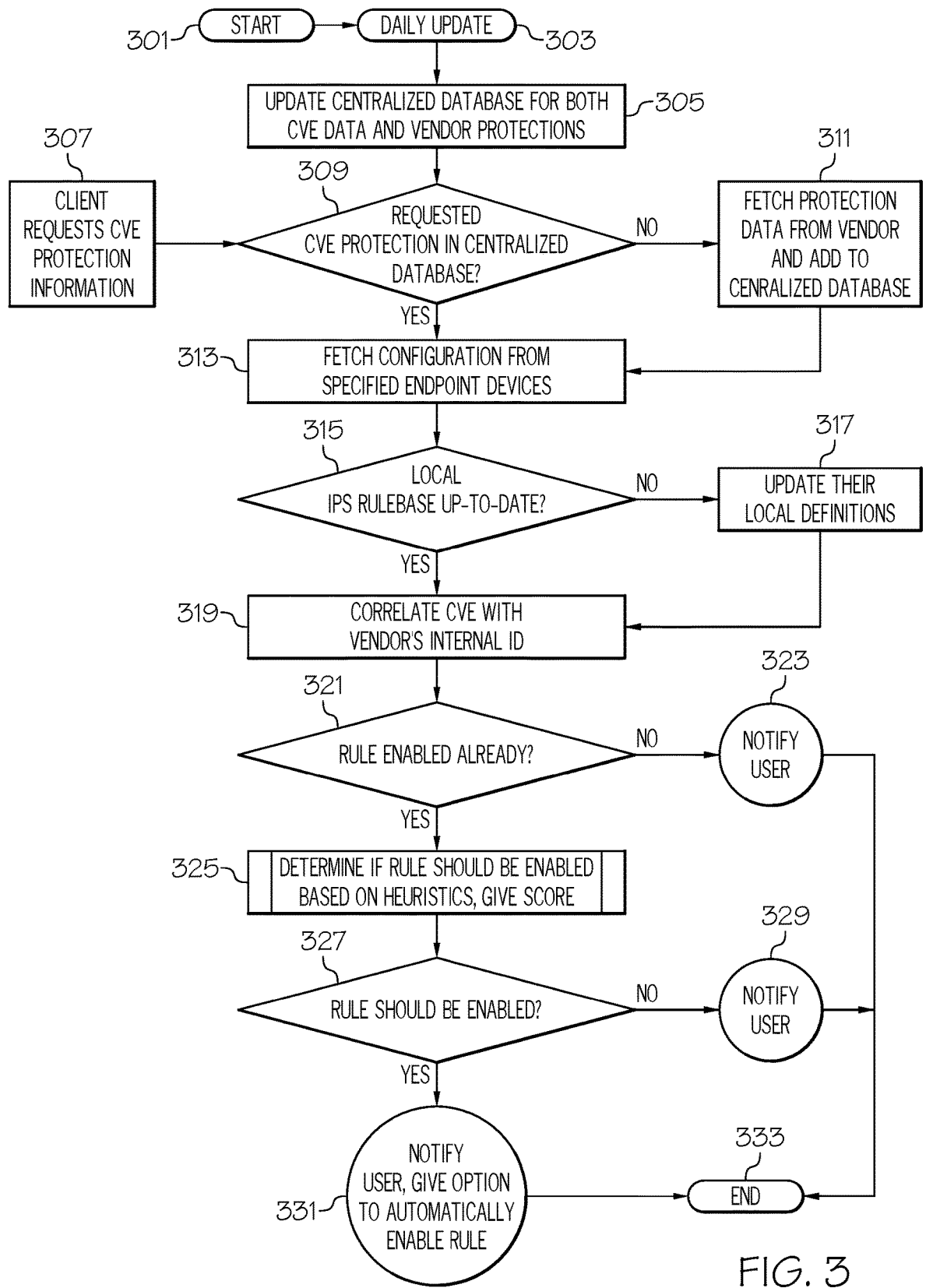
FIG. 3 depicts a data grabber process for receiving a new signature in accordance with one or more embodiments of the present invention.

With reference now to FIG. 3, a data grabber process as used in one or more embodiments of the present invention for receiving a new signature is presented.

After initiator block 301, an IPS signature vendor (e.g., IPS signature vendor 202 shown in FIG. 2) updates its records of new IPS signatures that it has generated (in response to new intrusions that have been detected), as well as reports from customers of updates to their Common Vulnerability Exposure (CVE), as shown in block 303.

As shown in block 305, this information is sent to a centralized database, such as the vulnerability database 212 shown in FIG. 2.

As shown in block 307, a client/customer (e.g., customer 216 and/or end user 234) requests CVE protection (e.g., an IPS signature) from the centralized database.

As shown in query block 309, if the requested CVE protection is not in the centralized database, then this requested CVE protection is retrieved from the vendor and added to the centralized database (see block 311). However, if the requested CVE protection is in the centralized database, then configuration data from specific endpoint devices (e.g., IPS 220) is retrieved by the customer, as shown in block 313.

As shown in query block 315, the customer determines if a local IPS rulebase (i.e., rules for what types of computer assets are protected by a particular IPS and/or which IPS signature vendor's products are used by that particular IPS) is up-to-date. If not, then local definitions for these IPSes (i.e., gateways, firewalls, etc.) are updated by scanning them for descriptions of their components (e.g., searching for Universally Unique Identifiers—UUIDs, associated with each component, either from a database or from a Radio Frequency Identifier—RFID chip attached to a device, an identifier in software associated with the component/asset, etc.), as shown in block 317. However, if the local IPS rulebase is up-to-date, then the customer's current CVE is correlated with an internal identifier (ID) of the IPS protection vendor (see block 319).

As shown in query block 321, a query is made as to whether a rule for which IPS gateway protects which particular computer asset(s) and which IPS protection is to be used is enabled. That is, not only must the customer's system know which particular IPS protects which computer asset(s) using particular IPS signature vendors, but the system must also be enabled (configured) to correlate a particular IPS signature to a particular IPS and a particular computer asset to a particular IPS signature, but must also authorize that particular IPS to install that particular IPS signature. If these conditions are already met, then the user is notified (block 323) that this particular IPS signature will be installed on that particular IPS, such that the process ends at terminator block 333.

However, if the rule has not been enabled (query block 321), then the customer's end user and/or analytics (e.g., analysis engine 228 shown in FIG. 2) will generate a score for whether or not the rule should be enabled, as shown in block 325. That is, a high score indicates that the rule should be enabled, while a low score indicates that the rule should not be enabled. Such scores are based on heuristics, such as those described in the discussion of asset context and other factors presented in FIG. 2 above and in FIG. 6 below.

As such, the customer's system and/or analyst determines in query block 327 whether the rule should be enabled. If not, the user is notified (along with a reason why the rule should not be enabled, such installing a new and yet unnecessary rule would result in overcongestion of rules that are already in the particular IPS, etc.), as shown in block 329, and the process ends at terminator block 333.

However, if the customer's system and/or analyst determines that the rule should be enabled, then the user (e.g., end user 234 shown in FIG. 2) is notified, as shown in block 331. This allows the end user/analyst to either manually enable the rule by implementing the signature in the IPS via the implementation engine 214 shown in FIG. 2, or to authorize a heuristic system (e.g., Deep Neural Network 624 shown in FIG. 6) to automatically enable the rule, thereby installing the signature in the IPS and ending the process at terminator block 333.

Figure 4:
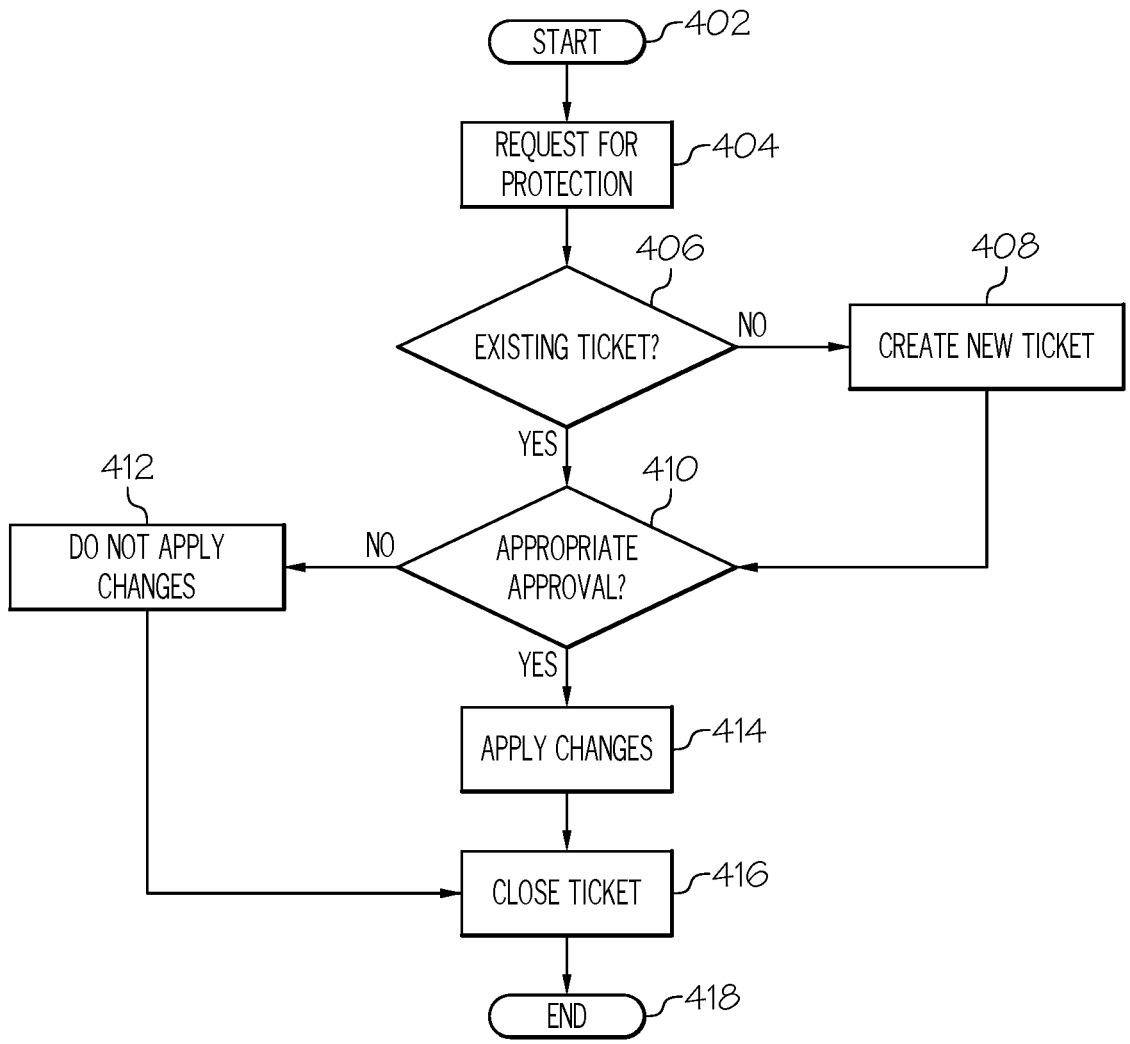
FIG. 4 illustrates a signature ticketing flow in accordance with one or more embodiments of the present invention.

With reference now to FIG. 4, a high-level flow chart illustrates a signature ticketing flow in accordance with one or more embodiments of the present invention.

After initiator block 402, a customer (e.g., customer 216 shown in FIG. 2) requests a signature (i.e., protection against an intrusion that is to be installed on a gateway/firewall, such as IPS 220 shown in FIG. 2) for protection against an intrusion, as shown in block 404.

As shown in query block 406, a query is made as to whether or not there is a ticket (work order) for the request made in block 404. If not, then a new ticket is created (see block 408). However, if there is already a ticket for the request made in block 404, then a query (see query block 410) is made as to whether an authorized party (e.g., end user 234 and/or customer 216) has granted approval to implement the changes described in the ticket. If not, then no changes are applied to the IPS that would be protected by the signature described in the ticket (block 412), and the ticket is closed (block 416), leading to the end of the process (terminator block 418). However, if the appropriate party has approved the ticket (query block 410), then the implementation engine 214 shown in FIG. 2 applies the changes to the appropriate IPS (i.e., the signature is installed on the appropriate IPS such as IPS 220), as shown in block 414, leading to the closing of the ticket (block 416) and the end of the process (termination block 418).

Figure 5:
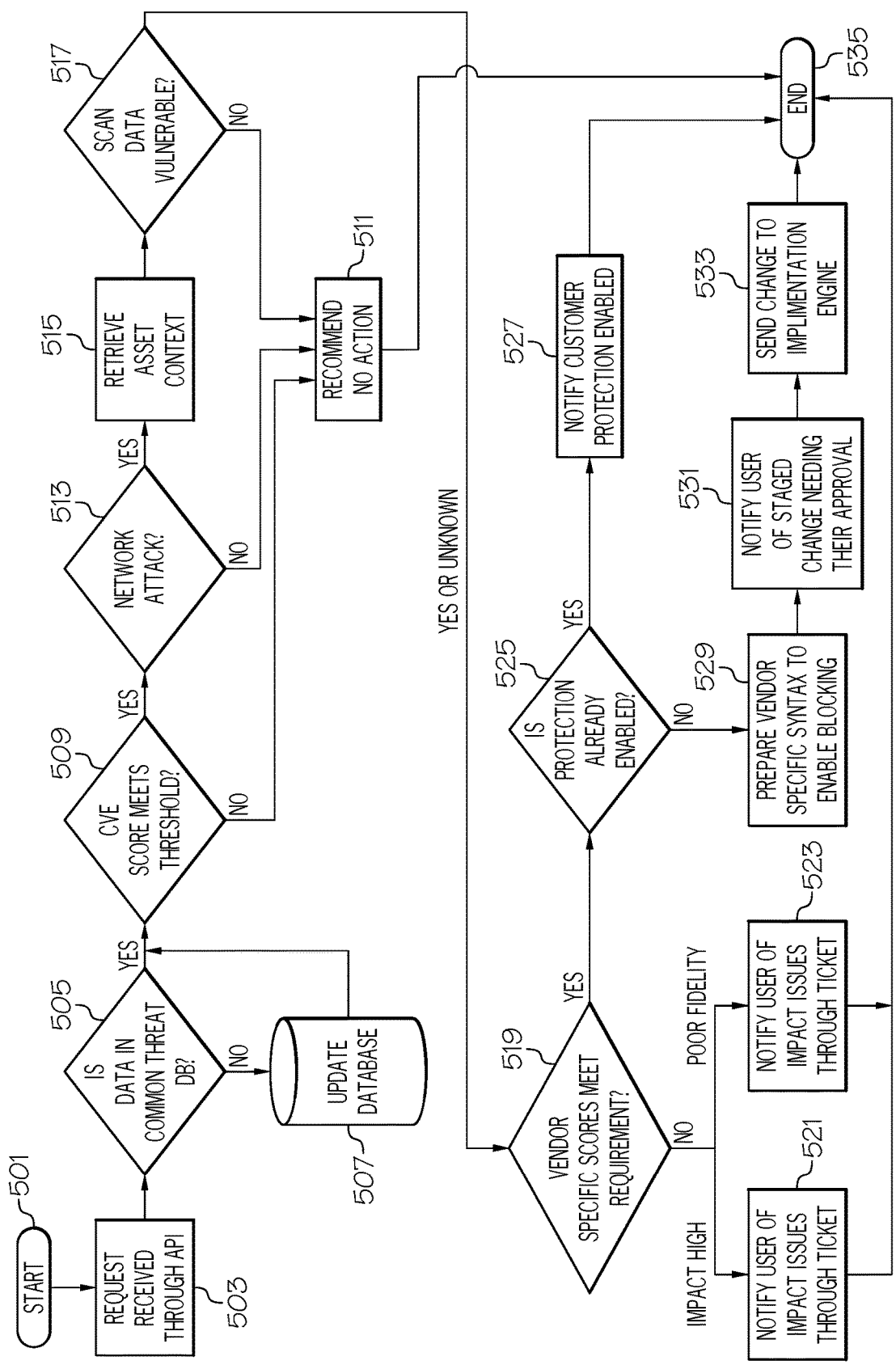
FIG. 5 depicts a recommendation engine flow in accordance with one or more embodiments of the present invention.

With reference now to FIG. 5, a high-level flowchart depicts a recommendation engine flow in accordance with one or more embodiments of the present invention.

After initiator block 501, a request for a signature to address a particular intrusion is received (e.g., through an Application Program Interface—API), as shown in block 503. For example, the end user 234 and/or the analysis engine 228 shown in FIG. 2 interface with an API (e.g., via the user interface 232 shown in FIG. 2 if the requester is the end user 234) to request a signature (i.e., protection for an IPS gateway/firewall from a particular intrusion).

As shown in query block 505, a query is made (e.g., by the analysis engine 228 shown in FIG. 2) to determine if the signature and/or particular intrusion are in a common threat database (e.g., vulnerability database 212 shown in FIG. 2). If not, then that database is updated to include that signature and/or a description of that particular intrusion, or the intrusion binary itself), as shown in block 507.

If the signature and/or particular intrusion are in the common threat database, then a query is made to query if the CVE score described above meets a threshold value (query block 509). If not, then no further action is taken (block 511), and the process ends (terminator block 535).

However, if the CVE score meets or exceeds the threshold that has been set, then a query is made as to whether a component of the network (e.g., computer asset 224 shown in FIG. 2) is under attack (query block 513). If not, then no further action is taken (block 511), and the process ends (terminator block 535).

However, if the network component is under attack, then the asset context for the computer asset (as described above) is retrieved (block 515). This leads to determining if the scan data (i.e., a description of the computer asset, such as computer asset 224 shown in FIG. 2) shows that the asset is, in fact, vulnerable to the intrusion, as shown in query block 517. If not, then no further action is taken (block 511), and the process ends (terminator block 535).

However, if the scan data shows that the computer asset is, or might be, vulnerable to the intrusion, then a query is made as to whether the vendor (e.g., IPS signature vendor 202) is to be trusted to provide an adequate/appropriate signature (query block 519). If the impact of the intrusion is so great that the signature vendor is not trusted/adequate to provide the proper signature (e.g., based on prior experience with that signature vendor), as shown in block 521, or if the signature is of poor fidelity just by looking at the code in the signature (block 523), then the customer (e.g., end user 234) is so notified, and the process ends at terminator block 535.

However, if the vendor is deemed capable of addressing this particular intrusion (query block 519), then a query is made to ask if the IPS gateway already has adequate protection (e.g., from another signature) to protect its computer asset from this particular intrusion (query block 525). If so, then the customer is notified (block 527), and the process ends (terminator block 535). However, if there is not already adequate protection from the intrusion, at the IPS level, then the implementation engine 214 shown in FIG. 2 will prepare the appropriate syntax to utilize the signature (block 529), notify the customer that approval to install the signature is needed (block 531), and then send, with the appropriate customer approval, the change (signature) to the appropriate IPS (block 533) via the implementation engine 214 shown in FIG. 2. Again, the process ends at terminator block 535.

Figure 6:
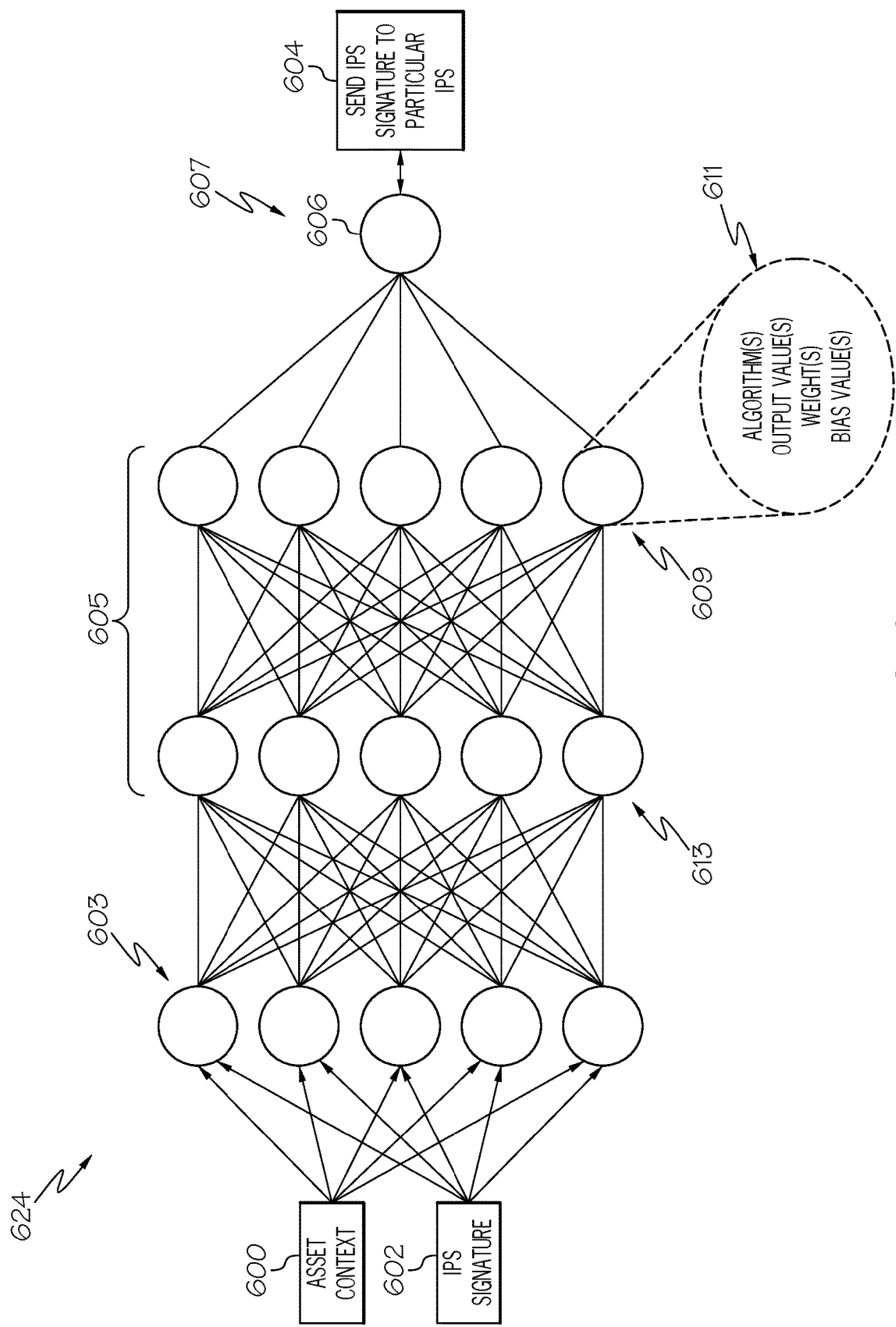
FIG. 6 illustrates an exemplary Deep Neural Network (DNN) being trained to determine which gateway is to receive a particular signature.

In one or more embodiments of the present invention, a Deep Neural Network (DNN) determines which IPS is to receive a particular IPS signature. FIG. 6 illustrates an exemplary DNN 624 (analogous to neural network 124, shown in FIG. 1) being trained to determine which IPS/gateway is to receive that particular signature.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron), which are received by the second neuron. These neurotransmitters can cause the second neuron to become excited or inhibited. A pattern of excited/inhibited interconnected neurons eventually leads to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are only "excitatory" to varying degrees.

The nodes within a neural network such as DNN 624 represent hardware processors, virtual processors, software algorithms, or a combination of hardware processors, virtual processors, and/or software algorithms.

In a deep neural network (DNN), such as DNN 624, electronic neurons are arranged in layers, known as an input layer, hidden layer(s), and an output layer. Thus, the electronic neurons (also referred to herein simply as "neurons" or "nodes") in DNN 624 are arranged in input layer 603, hidden layers 605, and output layer 607. The input layer 603 includes neurons/nodes that take input data, and send it to a series of hidden layers of neurons (e.g., hidden layers 605), in which neurons from one layer in the hidden layers are interconnected with all neurons in a next layer in the hidden layers 605. The final layer in the hidden layers 605 then outputs a computational result to the output layer 607, which is often a single node for holding vector information.

As just mentioned, each node in the depicted DNN 624 represents an electronic neuron, such as the depicted neuron 609. As shown in block 611, in one or more embodiments of the present invention, each neuron (including neuron 609) functionally includes at least four features: an algorithm, an output value, a weight, and a bias value.

The algorithm is a mathematic formula for processing data received from one or more upstream neurons. For example, assume that one or more of the neurons depicted in the middle hidden layers 605 send data values to neuron 609. Neuron 609 then processes these data values by executing the algorithm shown in block 611, in order to create one or more output values, which are then sent to another neuron, such as another neuron within the hidden layers 605 or a neuron 606 in the output layer 607. Each neuron also has a weight that is specific for that neuron and/or for other connected neurons, and indicate how significant the output from that neuron is. That is, a downstream neuron can ignore output from a lightly weighted upstream neuron, but must accept and process data from a heavily weighted upstream neuron. Furthermore, the output value(s) are added to bias value(s), which increases or decreases the raw output value, allowing the DNN 624 to be further "fine-tuned".

For example, assume that neuron 613 is sending the results of its analysis of a piece of data to neuron 609. Neuron 609 has a first weight that defines how important data coming specifically from neuron 613 is. If the data is important, then data coming from neuron 613 is weighted heavily, and/or increased by its bias value, thus causing the algorithm(s) within neuron 609 to generate an output that is then weighted higher and/or has a higher value, which has a corresponding impact on neurons in the output layer 607. That is, if neuron 613 has been determined to be significant to the operations of neuron 609, then the weight and/or bias in neuron 613 will be increased, such that neuron 609 receives a higher level of importance attributed to the output of the algorithm in the neuron 613. Alternatively, the output of neuron 609 can be minimized by decreasing the weight and/or bias used to affect the output of neuron 609. These weights/biases are adjustable for one, some, or all of the neurons in the DNN 624, such that a reliable output will result from output layer 607.

When asset context 600 (e.g., a description of a particular computer asset) and IPS signature 602 (e.g., a particular signature generated by an IPS signature vendor for a use by an IPS gateway to block the passage of a particular intrusion to that particular computer asset) are input into a trained version of DNN 624, an identification of which particular IPS should install the IPS signature is identified in an output 604 from the DNN 624. In order to provide this functionality, DNN 624 must first be trained.

As such, and in one or more embodiments of the present invention, known training asset contexts (depicted as asset context 600 during the training of the DNN 624) and known IPS signatures (depicted as IPS signature 602 during the training of the DNN 624) are input into DNN 624 in order to train DNN 624 using a manual process and/or a back-propagation process.

When manually adjusted during the training of DNN 624, algorithms, output values, weights, and/or biases are adjusted by the user, sensor logic, etc. in a repeated manner until the output from output layer 607 matches expectations. For example, assume that input layer 603 receives training inputs that describe a known particular type of asset context and known IPS signature. By manually and repeatedly adjusting the algorithm(s), output value(s), weight(s), and biases in one or more of the electronic neurons within DNN 624, the DNN 624 becomes a trained DNN that will correctly output a vector/value to the output layer 607, indicating that the neuron 606 describes a particular solution for installing the signature on the appropriate IPS, which is presented as output 604.

When automatically adjusted, the weights (and/or algorithm and/or bias values) are adjusted using "back propagation", in which weight values, algorithms, and/or bias values of the neurons are adjusted by using a "gradient descent" method that determines which direction each weight/bias/algorithm should be adjusted to. This gradient descent process moves the weight and/or bias in each neuron in a certain direction, and/or alters the algorithm itself, until the output from output layer 607 improves (e.g., accurately describes which IPS should have the signature installed thereon).

Thus, and in one or more embodiments of the present invention, DNN 624 is now trained to determine which IPS/gateway is to receive a particular signature, based on the IPS signature itself (depicted as IPS signature 602 at run time) and a description of the computer asset (depicted as asset context 600 at run time, which is an asset context such as that described above with reference to FIG. 2).

Thus, and in one or more embodiments of the present invention, DNN 624 is first trained by inputting a known training asset context data (depicted in FIG. 6 as asset context 600) and a known training IPS signature data (depicted in FIG. 6 as IPS signature 602) to generate an expected value in neuron 606 in the output layer 607. For example, assume that the known training asset context data describes a particular computer asset (e.g., a database system), and the known training IPS signature data describes a certain type of signature (e.g., for use with an IPS gateway that protects that type of database system). Using the manual or backpropagation processes described above, the DNN 624 is adjusted until the content of neuron 606 describes that particular type of IPS gateway that should install this type of IPS signature.

The training process then goes through other combinations of known training asset context descriptions and known training IPS signatures data until DNN 624 is a trained DNN capable of matching a particular type of IPS signature to a particular type of IPS gateway.

Thereafter, the trained DNN 624 will be able to evaluate other asset contexts and IPS signatures, in order to determine which IPS gateway, if any, in the customer's inventory should receive a particular IPS signature.

DNN 624 is an exemplary type of neural network used in one or more embodiments of the present. Other neural networks that can be used in one or more embodiments of the present invention include convolutional neural networks (CNNs) and neural networks that use other forms of deep learning.

Figure 7:
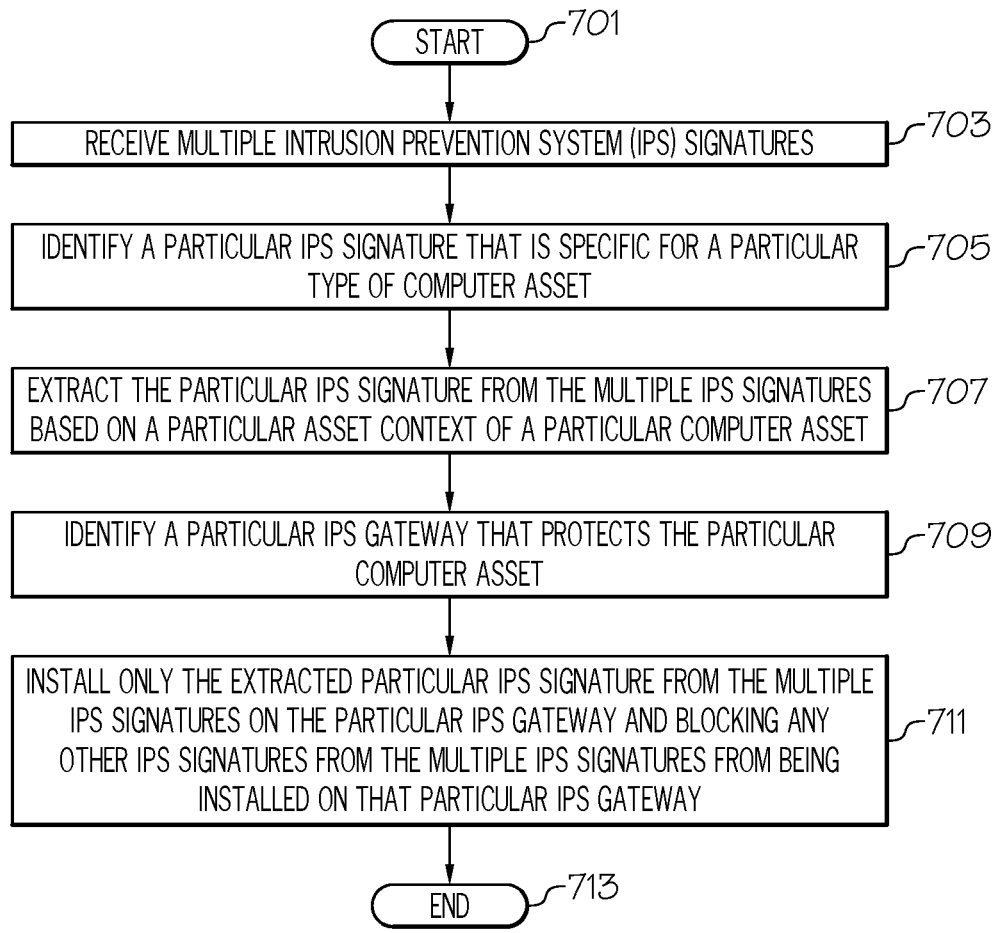
FIG. 7 is a high-level flow chart of one or more steps performed in accordance with one or more embodiments of the present invention.

With reference now to FIG. 7, a high-level flow chart of one or more steps performed in accordance with one or more embodiments of the present invention is presented.

After initiator block 701, a customer (e.g., end user 234 and/or implementation engine 214 and/or analysis engine 228 and/or customer 216 shown in FIG. 2) receives multiple signatures, as described in block 703. In one or more embodiments of the present invention, different signatures from the multiple signatures are specific for different types of gateways that protect different types of computer assets. That is, assume that IPS signature vendor 202 shown in FIG. 2 sends a set of multiple signatures to the end user 234. However, only one of these signatures is used by IPS 220 to protect computer asset 224. As such, there is no reason to install this signature on IPS 222, since only IPS 220 needs that signature.

As described in block 705, the analysis engine 228 shown in FIG. 2 identifies a particular signature from the multiple signatures. This particular signature is specific for a particular type of computer asset (e.g., computer asset 224). As described herein, the particular signature is code that causes a particular gateway to block an intrusion from reaching a particular computer asset that is of the particular type of computer asset. As such, the particular computer asset has a particular asset context that is specific for the particular computer asset.

As described in block 707, the analysis engine 228 shown in FIG. 2 extracts that particular signature from the multiple signatures based on the particular asset context. That is, the analysis engine 228 determines that this particular signature protects a particular computer asset (e.g., computer asset 224 shown in FIG. 2).

As described in block 709, the analysis engine 228 shown in FIG. 2 identifies a particular gateway (e.g., IPS 220 shown in FIG. 2) that protects the particular computer asset.

As described in block 711, the implementation engine 214 shown in FIG. 2 then installs only the extracted particular signature from the multiple signatures only on the particular gateway. That is, out of the multiple signatures received by the customer/end user, only the extracted particular signature that is specific for a computer asset that is actually part of the customer's system is used. More specifically, this extracted particular signature is only installed on IPS 220, and not IPS 222, since this extracted particular signature is specifically to protect computer asset 224. As such, IPS 222 is not burdened with a copy of this extracted particular signature, since IPS 222 has no need for this extracted particular signature. As such, the extracted particular signature is only installed on the particular gateway, and no other gateways.

In one or more embodiments of the present invention, the end user and/or customer and/or implementation engine expressly block any other signatures from the multiple signatures, other than the extracted particular signature, from being installed on that particular gateway.

The flowchart ends at terminator block 713.

In one or more embodiments of the present invention, the particular computer asset is a database system. The database system is specific type of database management system, which supports database programs designed to run on that database management system. As such, the particular asset context describes a level of vulnerability of the database system, an identification of the database system, a hostname of a host computer on which the database system is running, and an operating system used by the database system. In one or more embodiments of the present invention, all of this information is used (e.g., by DNN 624 shown in FIG. 6) when determining which IPS is to install the extracted particular signature.

In one or more embodiments of the present invention, the particular asset is a database program. This database program runs on a particular type of database system (e.g., the database management system just described). As such, the particular asset context describes a level of vulnerability of the database program, an identification of the database program, a hostname of a host computer on which the database program is running, a database system used by the database program, and an operating system used by the database system. In one or more embodiments of the present invention, all of this information is used (e.g., by DNN 624 shown in FIG. 6) when determining which IPS is to install the extracted particular signature.

In one or more embodiments of the present invention, the method further includes performing a Natural Language Processing (NLP) analysis on a set of vulnerabilities to extract risk-related information. This set of vulnerabilities describes vulnerabilities that apply to the particular gateway. This risk related information includes a list of vulnerable network resources that are protected by the particular gateway and that are vulnerable to the intrusion.

For example, consider vulnerability database 212 shown in FIG. 2. Assume that vulnerability database 212 includes information about a particular type of intrusion, including what types of computer assets are vulnerable to that type of intrusion. Furthermore, the information in the vulnerability database 212 also includes what types of computer assets are protected by what types of gateways. Thus, the vulnerability database 212 includes information about 1) what type of computer asset is vulnerable (could be harmed) by a particular type of intrusion, 2) what type of IPS gateway protects that type of computer asset, and 3) a description of the signature that, if installed on that type of IPS gateway, would prevent that particular type of intrusion from reaching that type of computer asset.

In order to ascertain all of this information, an NLP analysis will examine the text in the vulnerability database 212 describing this information, in order to ascertain 1) what type of computer asset is vulnerable (could be harmed) by a particular type of intrusion, 2) what type of IPS gateway protects that type of computer asset, and 3) a description of the signature that, if installed on that type of IPS gateway, would prevent that particular type of intrusion from reaching that type of computer asset.

In one or more embodiments of the present invention, a vulnerability of the particular computer asset to the intrusion is from a set of identified vulnerabilities (e.g., as found in vulnerability database 212 shown in FIG. 2). The set of identified vulnerabilities are identified in a Common Vulnerability Exposure (CVE) listing that is generated by a third party that monitors vulnerabilities for multiple computer systems.

In one or more embodiments of the present invention, a user and/or a computer system (e.g., implementation engine 214 shown in FIG. 2) train a Deep Neural Network (DNN) to identify the particular gateway by inputting the known training signature and a known training asset context into the DNN, as described in FIG. 6. As also described in FIG. 6, once the DNN is trained to recognize certain types of signatures and asset contexts, it will identify the particular gateway that is to receive the extracted particular signature by inputting the particular asset context and the extracted particular signature into the trained DNN.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service' s provider.

Broad network access: capabilities are available over a network and accessed through standard mechanisms that promote use by heterogeneous thin or thick client platforms (e.g., mobile phones, laptops, and PDAs).

Resource pooling: the provider' s computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
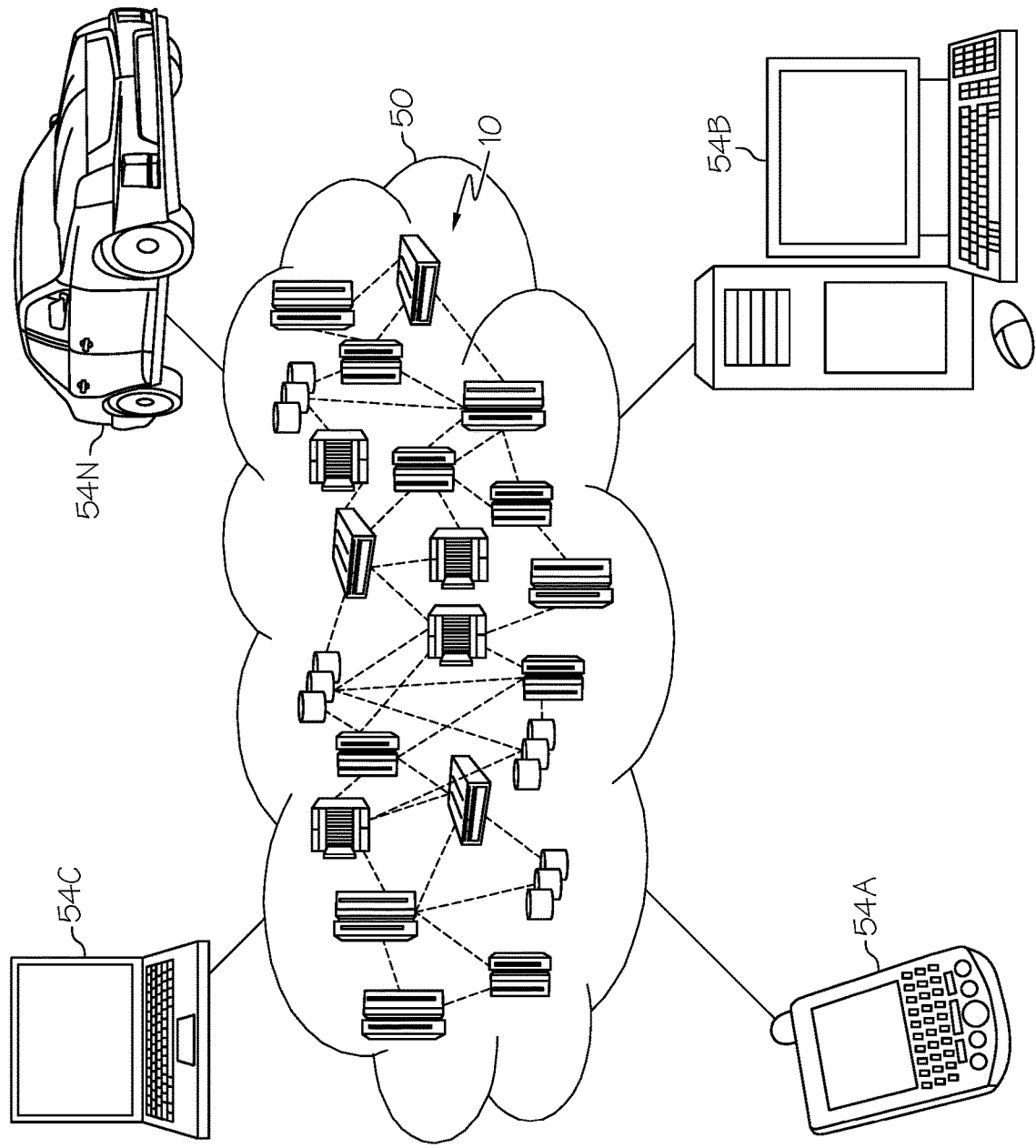
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 8 are intended to be illustrative only and that computing nodes 10 and cloud computing environment 50 can communicate with any type of computerized device over any type of network and/or network addressable connection (e.g., using a web browser).

Figure 9:
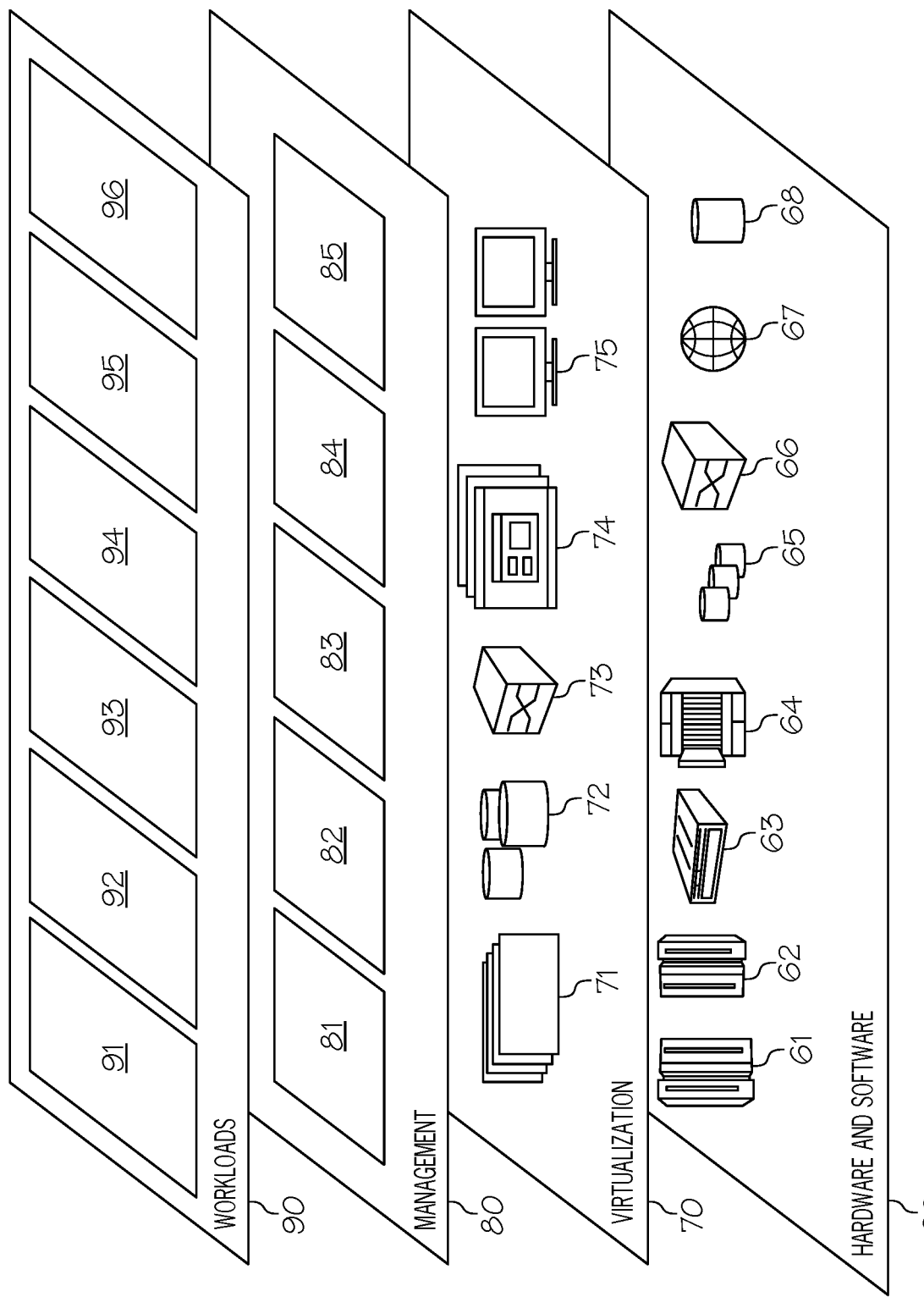
FIG. 9 depicts abstraction model layers of a cloud computer environment according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and vulnerability response processing 96, which performs one or more of the features of the present invention described herein.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also be stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method for protecting a computer asset, the method comprising:

receiving multiple signatures, wherein different signatures from the multiple signatures are specific for different types of computer assets;

identifying a particular signature from the multiple signatures, wherein the particular signature is specific for a particular type of computer asset, wherein the particular signature is code that causes a particular gateway to block an intrusion from reaching a particular computer asset that is of the particular type of computer asset, and wherein the particular computer asset has a particular asset context that is specific for the particular computer asset;

extracting the particular signature from the multiple signatures based on the particular asset context;

identifying a particular gateway that protects the particular computer asset; and installing the extracted particular signature from the multiple signatures only on the particular gateway.

2. The method of claim 1, wherein the particular computer asset is a database system, and wherein the particular asset context describes a level of vulnerability of the database system, an identification of the database system, a hostname of a host computer on which the database system is running, and an operating system used by the database system.

3. The method of claim 1, wherein the particular asset is a database program, and wherein the particular asset context describes a level of vulnerability of the database program, an identification of the database program, a hostname of a host computer on which the database program is running, a database system used by the database program, and an operating system used by the database system.

4. The method of claim 1, further comprising:

performing a Natural Language Processing (NLP) analysis on a set of vulnerabilities to extract risk related information, wherein the set of vulnerabilities describes vulnerabilities that apply to the particular gateway, and wherein the risk related information includes a list of vulnerable network resources that are protected by the particular gateway and that are vulnerable to the intrusion.

5. The method of claim 1, wherein a vulnerability of the particular computer asset to the intrusion is from a set of identified vulnerabilities, and wherein the set of identified vulnerabilities are identified in a Common Vulnerability Exposure (CVE) listing that is generated by a third party that monitors vulnerabilities for multiple computer systems.

6. The method of claim 1, further comprising:
training a Deep Neural Network (DNN) to identify the particular gateway by inputting a known training signature and a known training asset context into the DNN; and
identifying the particular gateway by inputting the particular asset context and the extracted particular signature into the trained DNN.

7. A computer program product comprising a computer readable storage medium having program code embodied therewith, wherein the computer readable storage medium is not a transitory signal per se, and wherein the program code is readable and executable by a processor to perform a method comprising:
receiving multiple Intrusion Prevention System (IPS) signatures, wherein different IPS signatures from the multiple IPS signatures are specific for different types of IPS gateways that protect different types of computer assets;
identifying a particular IPS signature from the multiple IPS signatures, wherein the particular IPS signature is specific for a particular type of computer asset, wherein the particular IPS signature is code that causes a particular IPS gateway to block an intrusion from reaching a particular computer asset that is of the particular type of computer asset, and wherein the particular computer asset has a particular asset context that is specific for the particular computer asset;
extracting the particular IPS signature from the multiple IPS signatures based on the particular asset context;
identifying a particular IPS gateway that protects the particular computer asset; and
installing the extracted particular IPS signature from the multiple IPS signatures only on the particular IPS gateway.

8. The computer program product of claim 7, wherein the particular computer asset is a database system, and wherein the particular asset context describes a level of vulnerability of the database system, an identification of the database system, a hostname of a host computer on which the database system is running, and an operating system used by the database system.

9. The computer program product of claim 7, wherein the particular asset is a database program, and wherein the particular asset context describes a level of vulnerability of the database program, an identification of the database program, a hostname of a host computer on which the database program is running, a database system used by the database program, and an operating system used by the database system.

10. The computer program product of claim 7, wherein the method further comprises:
performing a Natural Language Processing (NLP) analysis on a set of vulnerabilities to extract risk related information, wherein the set of vulnerabilities describes vulnerabilities that apply to the particular IPS gateway, and wherein the risk related information includes a list of vulnerable network resources that are protected by the particular IPS gateway and that are vulnerable to the intrusion.

11. The computer program product of claim 7, wherein a vulnerability of the particular computer asset to the intrusion is from a set of identified vulnerabilities, and wherein the set of identified vulnerabilities are identified in a Common Vulnerability Exposure (CVE) listing that is generated by a third party that monitors vulnerabilities for multiple computer systems.

12. The computer program product of claim 7, wherein the method further comprises:
training a Deep Neural Network (DNN) to identify the particular gateway by inputting a known training signature and a known training asset context into the DNN; and
identifying the particular gateway by inputting the particular asset context and the extracted particular signature into the trained DNN.

13. The computer program product of claim 7, wherein the program instructions are provided as a service in a cloud environment.

14. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:
receiving multiple Intrusion Prevention System (IPS) signatures, wherein different IPS signatures from the multiple IPS signatures are specific for different types of IPS gateways that protect different types of computer assets;
identifying a particular IPS signature from the multiple IPS signatures, wherein the particular IPS signature is specific for a particular type of computer asset, wherein the particular IPS signature is code that causes a particular IPS gateway to block an intrusion from reaching a particular computer asset that is of the particular type of computer asset, and wherein the particular computer asset has a particular asset context that is specific for the particular computer asset;
extracting the particular IPS signature from the multiple IPS signatures based on the particular asset context;
identifying a particular IPS gateway that protects the particular computer asset; and
installing the extracted particular IPS signature from the multiple IPS signatures only on the particular IPS gateway.

15. The computer system of claim 14, wherein the particular computer asset is a database system, and wherein the particular asset context describes a level of vulnerability of the database system, an identification of the database system, a hostname of a host computer on which the database system is running, and an operating system used by the database system.

16. The computer system of claim 14, wherein the particular asset is a database program, and wherein the particular asset context describes a level of vulnerability of the database program, an identification of the database program, a hostname of a host computer on which the database program is running, a database system used by the database program, and an operating system used by the database system.

17. The computer system of claim 14, wherein the method further comprises:
   performing a Natural Language Processing (NLP) analysis on a set of vulnerabilities to extract risk related information, wherein the set of vulnerabilities describes vulnerabilities that apply to the particular IPS gateway, and wherein the risk related information includes a list of vulnerable network resources that are protected by the particular IPS gateway and that are vulnerable to the intrusion.

18. The computer system of claim 14, wherein a vulnerability of the particular computer asset to the intrusion is from a set of identified vulnerabilities, and wherein the set of identified vulnerabilities are identified in a Common Vulnerability Exposure (CVE) listing that is generated by a third party that monitors vulnerabilities for multiple computer systems.

19. The computer system of claim 14, wherein the method further comprises:
   training a Deep Neural Network (DNN) to identify the particular gateway by inputting a known training signature and a known training asset context into the DNN; and
   identifying the particular gateway by inputting the particular asset context and the extracted particular signature into the trained DNN.

20. The computer system of claim 14, wherein the program instructions are provided as a service in a cloud environment.

\* \* \* \* \*